United States Patent [19]

Moberly

[11] 3,878,176

[45] Apr. 15, 1975

[54] ARYLENE SULFIDE POLYMERS

[75] Inventor: Charles W. Moberly, Bartlesville, Okla.

[73] Assignee: Phillips Petroleum Company, Bartlesville, Okla.

[22] Filed: Nov. 19, 1973

[21] Appl. No.: 416,817

[52] U.S. Cl. ................................ 260/79.1; 260/79
[51] Int. Cl. ............................................ C08g 23/00
[58] Field of Search ............................. 260/79, 79.1

[56] References Cited
UNITED STATES PATENTS 2,538,941   1/1951   Macallum ......................... 260/79.1
3,268,504   8/1966   Harris et al. ....................... 260/79.1

Primary Examiner—Melvyn I. Marquis

[57] ABSTRACT

A method of producing arylene sulfide polymers employing (1) polyhalo-substituted aromatic compounds; (2) elemental sulfur; (3) bases selected from the hydroxides of lithium, sodium, potassium, rubidium, cesium, magnesium, calcium, strontium and barium, and, (4) organic amides.

15 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129, In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which elemental sulfur, at least one base selected from the hydroxides of lithium, sodium, potassium, rubidium, cesium, magnesium, calcium, strontium and barium, and at least one organic amide are contacted.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalosubstituted aromatic compounds described and exemplified in the aforementioned U.S. Pat. No. 3,354,129. If desired, mixtures of polyhalo-substituted aromatic compounds can be used.

The elemental sulfur which is employed in the present invention can be used in any of its allotropic forms.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, and mixtures thereof. If desired, the hydroxide can be produced in situ by the reaction of the corresponding oxide with water.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethyl-propionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the sulfur, the base and the organic amide or which can be present in a composite formed from the sulfur, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the sulfur, the base and the organic amide is maintained at polymerization conditions to produce the arylene sulfide polymer.

The ratio of reactants can vary considerably but about 0.6 to about 2, and preferably about 0.65 to about 1.2, gram-moles of the polyhalosubstituted aromatic compound will generally be employed per gram-atom of sulfur. The base generally will be employed in an amount within the range of from about 1 to about 5, and preferably from about 1.5 to about 4, gramequivalents per gram-atom of sulfur. As used herein, one gram-equivalent of the hydroxides of magnesium, calcium, strontium, and barium represents the same amount as one-half gram-mole of these substances, whereas for the hydroxides of lithium, sodium, potassium, rubidium, and cesium, the amount represented by one gram-equivalent is the same as that represented by one gram-mole.

The amount of organic amide employed can also vary over a wide range but will generally be within the range of from about 100 grams to about 2500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

The previous statements are based upon the following example.

In the following example, values for inherent viscosity were determined at 206° C. in 1-chloronaphthalene at a polymer concentration of 0.4 g/100 ml solution.

EXAMPLE I

The method of the invention is illustrated by the data of Table I, all runs set forth therein having been carried out in the following general manner, except for minor variations indicated in the table.

275 grams of N-methyl-2-pyrrolidone were introduced into a reactor. The indicated amount of sodium hydroxide was then introduced into the N-methyl-2-pyrrolidone to form a first mass. Elemental sulfur in the form of flowers of sulfur was introduced into the first mass to form a second mass.

The reactor was closed and flushed by alternately pressuring with nitrogen and venting to atmospheric pressure. With about 0.05 SCFH nitrogen flowing into the reactor, the distillation tube was connected and the contents of the reactor were heated to a temperature of 196° C. That material which distilled off was collected and found to consist essentially of water and N-methyl-2-pyrrolidone.

When the reactor temperature reached 196° C., the reactor was cooled to about 191° C. To the contents of the reactor there was then added 1.03 moles of 1,4-dichlorobenzene in a solution of 52 grams of N-methyl-2-pyrrolidone. The solution was pressured into the reactor by nitrogen pressure and the reactor pressure was thereafter adjusted to about 5-10 psig by venting.

The temperature of the contents of the reactor was then increased to about 246° C. and maintained at that temperature for three hours. The contents of the reactor were then cooled to about 66° C. and the poly(p-phenylene sulfide) product was recovered.

In those runs in which there appeared to be a low conversion to polymer, a combination of methanol washes and hot water washes was employed to recover the polymer. In those runs in which there appeared to be a high conversion to polymer, four hot water washes of the product were employed. The product, in all instances, was dried in a vacuum at 80°-100° C. after the last wash, the product being swept with nitrogen during the drying.

Yields were calculated on the basis of 108 grams of poly(p-phenylene sulfide) as the theoretical yield from one mole of 1,4-dichlorobenzene.

What is claimed is:

1. A method of producing polymers comprising:
   a. forming a composition by contacting sulfur, at least one polyhalo-substituted aromatic compound in which the halogen atoms are attached to aromatic ring carbon atoms, at least one base selected from the hydroxides of lithium, sodium, potassium, rubidium, cesium, magnesium, calcium, strontium and barium, and at least one organic amide; and,
   b. maintaining at least a portion of said composition at polymerization conditions to produce said polymer.

2. The method of claim 1 in which said polyhalo-substituted aromatic compound is employed in an amount within the range of from about 0.6 to about 2 gram-moles per gram-atom of sulfur.

3. The method of claim 1 in which said base is employed in an amount within the range of from about 1 to about 5 gram-equivalents per gram-atom of sulfur.

4. The method of claim 1 in which said organic amide is employed in an amount within the range of from about 100 grams to about 2500 grams per gram-mole of said polyhalo-substituted aromatic compound.

5. The method of claim 1 in which said base is sodium hydroxide and said polyhalo-substituted aromatic compound is 1,4-dichlorobenzene.

6. The method of claim 5 in which said base is employed in an amount within the range of from about 1 to about 5 gram-equivalents per gram-atom of sulfur and said 1,4-dichlorobenzene is employed in an amount within the range of from about 0.6 to about 2 gram-moles per gram-atom of sulfur.

7. The method of claim 1 in which water is removed

Table I

Materials Employed

| Run No. | Gram-atoms Sulfur | NaOH | Gram-moles 1,4-Dichlorobenzene | Maximum Pressure | Polymer Yield % | Polymer S Content | Polymer Properties Inherent Viscosity |
|---|---|---|---|---|---|---|---|
| 1 | 1 | 1.5 | 1.03 | 300+ | 24 | — | 0.02 |
| 2 | 1(b) | 2 | 1.03 | 293 | 69 | — | 0.02 |
| 3 | 1 | 2 | 1.03 | 250 | 67 | 25.5(a) | 0.05 |
| 4 | 1 | 2.5 | 1.03 | 65 | 70 | — | 0.06 |
| 5 | 1 | 3 | 1.03 | 85 | 47 | 25.6 | 0.03 |
| 6 | 1 | 4 | 1.03 | 50 | 26 | 23.5(a) | Insol |
| 7 | 1.125 | 2.81 | 1.03 | 65 | 75 | — | 0.07 |
| 8 | 1.125 | 2.81 | 1.03(d) | 100 | 81 | — | 0.11 |
| 9 | 1.19 | 2.98 | 1.03 | 65 | 79 | — | 0.07 |
| 10 | 1.19 | 2.98 | 1.03(d) | 110 | 82 | — | 0.09 |
| 11 | 1.25 | 3.125 | 1.03 | 70 | 83 | 25.8 | 0.07 |
| 12 | 1.25 | 2.5 | 1.03 | 170 | 87 | 28.2 | 0.07 |
| 13 | 1.25 | 2.5 | 1.03 | 200+ | 59(c) | — | 0.03 |
| 14 | 1.5 | 3 | 1.03 | 262 | 12 | — | 0.03 |

(a) Analysis on methanol-extracted polymer.
(b) Sulfur dissolved in N-methyl-2-pyrrolidone in reactor prior to addition of sodium hydroxide solution.
(c) Reaction period was 6 hrs. at 246° C.
(d) 1,4-dichlorobenzene added at the time of initial charge.

It is within the scope of this invention to bring the polyhalosubstituted aromatic compound, the sulfur, the base and the organic amide into contact in any order.

Also, it is within the scope of this invention to remove water from any combination of the aforesaid compounds.

It will be evident from the foregoing that various modifications can be made to the method of this invention. Such are considered, however, to be within the scope thereof.

from said composition.

8. A method of producing a polymer which comprises:
   a. contacting sulfur, at least one base selected from the hydroxides of lithium, sodium, potassium, rubidium, cesium, magnesium, calcium, strontium and barium, and at least one organic amide to form a first composition;
   b. contacting at least a portion of said first composition with at least one polyhalo-substituted aromatic compound in which the halogen atoms are attached to aromatic ring carbon atoms to form a second composition; and, c. maintaining said second composition at polymerization conditions to form said polymer.

9. The method of claim 8 in which said polyhalo-substituted aromatic compound is employed in an amount within the range of from about 0.6 to about 2 gram-moles per gram-atom of sulfur.

10. The method of claim 8 in which said base is employed in an amount within the range of from about 1 to about 5 gram-equivalents per gram-atom of sulfur.

11. The method of claim 8 in which said organic amide is employed in an amount within the range of from about 100 grams to about 2500 grams per gram-mole of said polyhalo-substituted aromatic compound.

12. The method of claim 8 in which said base is sodium hydroxide and said polyhalo-substituted aromatic compound is 1,4-dichlorobenzene.

13. The method of claim 12 in which said sodium hydroxide is employed in an amount within the range of from about 1 to about 5 gram-equivalents per gram-atom of sulfur and said 1,4-dichlorobenzene is employed in an amount within the range of from about 0.6 to about 2 gram-moles per gram-atom of sulfur.

14. The method of claim 12 in which water is removed from said first composition.

15. The method of claim 13 in which water is removed from said first composition.

* * * * *